(12) United States Patent
Mukai et al.

(10) Patent No.: US 10,141,573 B2
(45) Date of Patent: Nov. 27, 2018

(54) LITHIUM SECONDARY BATTERY NEGATIVE ELECTRODE ACTIVE MATERIAL AND METHOD FOR MANUFACTURING SAME

(71) Applicants: NATIONAL INSTITUTE OF ADVANCED INDUSTRIAL SCIENCE AND TECHNOLOGY, Tokyo (JP); ISUZU GLASS LTD., Osaka (JP)

(72) Inventors: Takashi Mukai, Osaka (JP); Taichi Sakamoto, Osaka (JP); Yuta Ikeuchi, Osaka (JP); Tetsuo Sakai, Osaka (JP); Naoto Yamashita, Osaka (JP); Koichiro Ikeda, Osaka (JP); Kiichiro Yamaguchi, Osaka (JP)

(73) Assignees: NATIONAL INSTITUTE OF ADVANCED INDUSTRIAL SCIENCE AND TECHNOLOGY, Tokyo (JP); ISUZU GLASS LTD., Osaka (JP)

( * ) Notice: Subject to any disclaimer, the term of this patent is extended or adjusted under 35 U.S.C. 154(b) by 528 days.

(21) Appl. No.: 14/783,113

(22) PCT Filed: Feb. 26, 2014

(86) PCT No.: PCT/JP2014/054760
§ 371 (c)(1),
(2) Date: Oct. 8, 2015

(87) PCT Pub. No.: WO2014/167906
PCT Pub. Date: Oct. 16, 2014

(65) Prior Publication Data
US 2016/0072127 A1 Mar. 10, 2016

(30) Foreign Application Priority Data
Apr. 10, 2013 (JP) .................... 2013-082505

(51) Int. Cl.
*H01M 4/58* (2010.01)
*H01M 10/052* (2010.01)
(Continued)

(52) U.S. Cl.
CPC .......... *H01M 4/5815* (2013.01); *C01G 19/00* (2013.01); *C01G 30/008* (2013.01); *H01M 4/364* (2013.01);
(Continued)

(58) Field of Classification Search
CPC .... H01M 4/5815; H01M 4/485; H01M 4/364; H01M 4/387; H01M 4/386; H01M 4/366;
(Continued)

(56) References Cited

U.S. PATENT DOCUMENTS 9,070,941 B2 * 6/2015 Mukai .................. H01M 4/136
9,553,308 B2 * 1/2017 Ikeda ................... H01M 4/136
(Continued)

FOREIGN PATENT DOCUMENTS

EP  2541656 A1  1/2013
JP  2011/260367 A  9/1999
(Continued)

OTHER PUBLICATIONS

Extended European Search Report, Application No. 14782233.2 dated Aug. 5, 2016.
(Continued)

*Primary Examiner* — Michael L Dignan
(74) *Attorney, Agent, or Firm* — The Dobrusin Law Firm, P.C.

(57) ABSTRACT

The teachings herein are directed at a lithium secondary battery negative electrode active material consisting of a Sn Sb based sulfide that delivers a high electrode capacity density, excellent output characteristics, and excellent cycle life characteristics and also provide a method for manufac-
(Continued)

turing the lithium secondary battery negative electrode active material, said method being capable of easily manufacturing the high performance lithium secondary battery negative electrode active material at low cost without requiring a high-temperature processing step and special facilities as required in a glass melting method. The negative electrode active material preferably is prepared using a method that includes a step of obtaining a Sn Sb based sulfide precipitate by adding an alkali metal sulfide to a mixed solution of a tin halide and an antimony halide.

18 Claims, 5 Drawing Sheets

(51) Int. Cl.
*H01M 4/36* (2006.01)
*H01M 4/38* (2006.01)
*H01M 4/48* (2010.01)
*C01G 30/00* (2006.01)
*H01M 4/485* (2010.01)
*C01G 19/00* (2006.01)
*H01M 4/02* (2006.01)

(52) U.S. Cl.
CPC .......... *H01M 4/366* (2013.01); *H01M 4/386* (2013.01); *H01M 4/387* (2013.01); *H01M 4/48* (2013.01); *H01M 4/485* (2013.01); *H01M 10/052* (2013.01); *C01P 2002/02* (2013.01); *C01P 2002/04* (2013.01); *C01P 2002/72* (2013.01); *C01P 2004/61* (2013.01); *C01P 2004/62* (2013.01); *C01P 2004/82* (2013.01); *C01P 2006/40* (2013.01); *H01M 2004/027* (2013.01); *H01M 2220/20* (2013.01); *Y02T 10/7011* (2013.01)

(58) Field of Classification Search
CPC .. H01M 4/48; H01M 10/052; H01M 2220/20; H01M 2004/027; C01G 19/00; C01G 30/008; Y02T 10/7011
See application file for complete search history.

(56) References Cited

U.S. PATENT DOCUMENTS

| 2009/0029258 | A1* | 1/2009 | Seo ........................ B82Y 30/00 |
| | | | 429/231.95 |
| 2009/0117466 | A1* | 5/2009 | Zhamu ..................... H01M 4/02 |
| | | | 429/231.8 |
| 2012/0045687 | A1* | 2/2012 | Wang ..................... C04B 35/532 |
| | | | 429/163 |
| 2012/0121973 | A1* | 5/2012 | Seo ........................ B82Y 30/00 |
| | | | 429/199 |
| 2015/0107673 | A1* | 4/2015 | Ito ..................... H01L 21/02568 |
| | | | 136/263 |

FOREIGN PATENT DOCUMENTS

| JP | 2003/059492 | A | 2/2003 |
| JP | 2003-077461 | A | 3/2003 |
| JP | 2008/103282 | A | 5/2008 |
| JP | 2011/65983 | A | 3/2011 |
| JP | 2011-134551 | A | 7/2011 |
| WO | 2011/078197 | A1 | 6/2011 |
| WO | 2012/117638 | A1 | 9/2012 |

OTHER PUBLICATIONS

Riki Kataoka et al, "Development of High Capacity Positive Electrode Material for Sodium Ion Battery".
Chinese Office Action with Translation, Application No. 201280053204.0 dated Nov. 4, 2015.
Yamashita et al. "The substance of lectures for the 52nd battery debate", 1C04, p. 108 (2011) Publication date: Oct. 17, 2011.
Mukai et al. The substance of lectures for the 79th battery debate, 3D32, p. 138 (2012) Publication date: Mar. 29, 2012.
Yamashita et al. The substance of lectures for the 53rd battery debate, 1D29, p. 227 (2012) Publication date: Nov. 14, 2012.
Korean Office Action with Translation, Application No. 10-2014-7013830 dated Nov. 17, 2015.
International Search Report for International Patent Application No. PCT/JP2014/054760, dated Jun. 24, 2014.
International Preliminary Report on Patentability and Written Opinion of the International Searching Authority for International Patent Application No. PCT/JP2014/054760, dated Oct. 13, 2015.

* cited by examiner

LITHIUM SECONDARY BATTERY NEGATIVE ELECTRODE ACTIVE MATERIAL AND METHOD FOR MANUFACTURING SAME

TECHNICAL FIELD

This invention relates to a high performance negative electrode active material for lithium secondary battery and a method for easily manufacturing the high performance negative electrode active material for a lithium secondary battery without the need of high temperature processing or any special facilities.

BACKGROUND ART

Lithium secondary battery has been commercially available for more than twenty years and remarkably developed its capacity and performance. In recent years, the lithium secondary battery has also been increasingly used as an in-car power supply in addition to as a power supply of an information-communication device, and thus is expected to provide higher capacity and higher output.

However, there are some problems: a graphite negative electrode comprising a graphite system as an active material is used for a commercially available lithium secondary battery and thus an electrolytic solution is limited to an ethylene carbonate (EC) system; and the electrode and the electrolytic solution tend to react when the battery's temperature reaches more than 45° C., causing the lithium secondary battery to be severely deteriorated. On the other hand, when the battery's temperature is 0° C. or less, Li dendrite is likely to generate at the time of charge. Accordingly, it is necessary to prevent a short circuit using a microporous separator with pore size of 100 nm or less, and thus a separator such as a woven fabric and a nonwoven fabric has not been preferably used. Furthermore, a carbon-based negative electrode has higher conductivity in a direction of electrode plane, and thus a large current flow in a short-circuited part in an internal short circuit test, such as nail penetration, rapidly produces heat, resulting in thermal runaway of a battery.

In order to break limits of conventional lithium secondary batteries and expand the industrial field, any change is essential and thus research and development of any negative electrode material such as Sn system and Si system has been actively performed.

The inventors have reported that Sn—Sb based sulfide glass functions as a negative electrode material of a lithium secondary battery or a sodium secondary battery and stably works even under the environment of −20 to 60° C. It has been found that when in particular used for the lithium secondary battery, Sn—Sb based sulfide glass can be combined with Si to obtain stable cycle life in a capacity of 1000-2000 mAh/g (nonpatent literatures 1-3).

However, Sn—Sb based sulfide glass requires special facilities since it is obtained by fusion in hot sulfur gas atmosphere at the temperature of about 1000° C. Furthermore, the Sn—Sb based sulfide glass is combined with Si by further mechanical milling process, which is complex and accordingly raises the production cost.

PRIOR ART DOCUMENTS

Nonpatent Literature

[Non Patent Document 1] The substance of lectures for the 52nd battery debate, 1C04, p. 108 (2011)

[Non Patent Document 2] The substance of lectures for the 79th battery debate, 3D32, p. 138 (2012)

[Non Patent Document 3] The substance of lectures for the 53rd battery debate, 1 D29, p. 227 (2012)

SUMMARY OF THE INVENTION

Problems to be Solved by the Inventions

The present invention is made in view of the present condition of the above-mentioned prior art, and mainly aims to provide a negative electrode active material for a lithium secondary battery consisting of Sn—Sb based sulfide which shows excellent output characteristics and cycle life characteristics in high electrode capacity density, and a method for easily and inexpensively manufacturing such a high performance negative electrode active material for lithium secondary battery without the need of high temperature processing steps or any special facilities required for a glass melting method.

Means to Solve the Problems

The negative electrode active material for lithium secondary battery of the present invention contains Sn—Sb based sulfide, wherein the Sn—Sb based sulfide has a disordered crystal structure which is in an intermediate state of a crystal and an amorphous. The Sn—Sb based sulfide having the disordered crystal structure shows the same degree of battery performance as Sn—Sb based sulfide glass obtained by a glass melting method. The negative electrode using such Sn—Sb based sulfide as an active material is less likely to rapidly generate heat in an internal short circuit test, such as nail penetration, resulting in improvement of battery safety. The disordered crystal refers to a substance in the intermediate state between a crystal and an amorphous. Taking antimony sulfide as an example, it has a structure wherein an antimony array is regular but a location and an array of a sulfur element around the antimony are random, and the antimony element exhibiting crystal structure and the sulfur element exhibiting amorphous structure are mixed in one substance.

The negative electrode active material for lithium secondary battery of the present invention contains a compound powder with A component particle surface coated with Sn—Sb based sulfide, the A component may be an element or a compound comprising the element which can occlude a lithium ion in early charge and occlude and release the lithium ion in the subsequent charge and discharge. The coating of the A component particle surface with Sn—Sb based sulfide results in Sn—Sb based sulfide around the A component nucleus. This can suppress any cracking due to expansion and contraction of the A component following the occlusion and release (charge and discharge) of lithium. This makes possible it for even an active material having shorter cycle life only with the A component to improve cycle characteristics, and thus also makes it possible for a high-capacity (high volume expansion) active material to obtain better cycle life characteristics.

The negative electrode active material for lithium secondary battery of the present invention preferably has a ratio of A component to Sn—Sb based sulfide in the compound powder being A component: 10 to 80 mass % and Sn—Sb based sulfide: 90 to 20 mass %, given the total of the both is 100 mass %. By using this negative electrode active material, it is possible to manufacture a long life or high capacity type negative electrode.

The negative electrode active material for lithium secondary battery of the present invention preferably has a 0.1-20 micrometer of a particle diameter D50 of the A component by a laser diffraction/a dispersion-type particle size distribution method. This allows compound powder to be uniform and the negative electrode active material can be used for producing excellent cycle life characteristics.

The method of manufacturing the negative electrode active material for lithium secondary battery containing the Sn—Sb based sulfide of the present invention comprises a step of obtaining a precipitate of Sn—Sb based sulfide by adding alkali metal sulfide to a mixed solution of tin halide and antimony halide.

The Sn—Sb based sulfide obtained by the manufacturing method of the present invention shows same degrees of battery performance as a Sn—Sb based sulfide glass obtained by a glass melting method, and the negative electrode using the Sn—Sb based sulfide as an active material is less likely to rapidly generate heat in an internal short circuit test, such as nail penetration, resulting in improvement of battery safety. Furthermore, it is possible to easily manufacture the Sn—Sb based sulfide at a low cost without the need of high temperature processing steps or special facilities required for a glass melting method.

In the manufacturing method of the present invention, it is preferable that the mixed solution of tin halide and antimony halide also contains an organic acid.

By addition of this organic acid, it is possible to shorten the time required for dissolving the tin halide and the antimony halide. When, in particular, $SnCl_2$ and $SbCl_3$ are simultaneously dissolved, $SbCl_3$ does not dissolve easily and thus powder to be obtained is less likely to be uniform. For that purpose, addition of an organic acid can improve solubility of various kinds of halides and enhance their productivities. Addition of the organic acid may also produce a specific effect of bringing about disordered crystallization of the obtained sulfide. This produces a remarkable effect of improving life characteristics of the negative electrode active material.

In the manufacturing method of the present invention, it is preferable that the amount of alkali metal sulfide to be added is 1-4 mol with respect to 1 mol of the total amount of tin halide and antimony halide. This facilitates progress of precipitation reaction and makes it possible to obtain a desired object without losing the precipitate of Sn—Sb based sulfide.

The manufacturing method of the present invention preferably includes a step of (1) producing a compound powder with A component particle surface being coated with Sn—Sb based sulfide by dispersing A component powder in a mixed solution of tin halide and antimony halide, and subsequently adding an alkali metal sulfide solution into the mixed solution to produce, or (2) producing a compound powder with A component particle surface being coated with Sn—Sb based sulfide by dispersing A component powder in an alkali metal sulfide solution and subsequently adding the mixed solution of tin halide and antimony halide into the alkali metal sulfide solution. The A component is an element or a compound comprising the element which can occlude a lithium ion in early charge and occlude and release the lithium ion in the subsequent charge and discharge.

The coating of the A component particle surface with Sn—Sb based sulfide results in Sn—Sb based sulfide around the A component nucleus. This can suppress any cracking due to expansion and contraction of the A component following the occlusion and release (charge and discharge) of lithium. This makes possible it for even an active material having shorter cycle life only with the A component to improve cycle characteristics, and thus also makes it possible for a high-capacity (high volume expansion) active material to obtain better cycle life characteristics.

In the manufacturing method of the present invention, a ratio of A component to Sn—Sb based sulfide in the compound powder is preferably A component: 10 to 80 mass % and Sn—Sb based sulfide: 90 to 20 mass %, given the total of the both is 100 mass %. By using this negative electrode active material, it is possible to manufacture a long life or high capacity type negative electrode.

In the manufacturing method of the present invention, a particle diameter D50 of the A component by a laser diffraction/a dispersion-type particle size distribution method is preferably 0.1-20 micrometer. This can make the compound powder uniform and this compound powder can be used to manufacture the negative electrode active material having excellent cycle life characteristics.

In the manufacturing method of the present invention, it is preferable that the mixed solution of tin halide and antimony halide further contains an conductive auxiliary agent and/or a binding agent to produce a compound powder, wherein the A component particle surface is coated with Sn—Sb based sulfide and the conductive auxiliary agent and/or the binding agent is contained in the Sn—Sb based sulfide. This makes it possible to produce a negative electrode active material having excellent conductivity and improved binding property of the Sn—Sb based sulfide.

Effect of the Invention

According to the present invention, it is possible to easily and inexpensively manufacture a negative electrode active material for lithium secondary battery consisting of Sn—Sb based sulfide which shows excellent output characteristics and cycle life characteristics in high electrode capacity density without the need of high temperature processing steps or any special facilities required for a glass melting method.

DETAILED DESCRIPTION OF THE INVENTION

Embodiments of the negative electrode active material for lithium secondary battery and its manufacturing method according to the present invention will be described below.

The negative electrode active material for lithium secondary battery containing the Sn—Sb based sulfide of the present invention is obtained by a step of obtaining a precipitate of Sn—Sb based sulfide by adding alkali metal sulfide to a mixed solution of tin halide and antimony halide.

Addition of alkali metal sulfide to the mixed solution of tin halide and antimony halide causes precipitation of the Sn—Sb based sulfide. This precipitate can be filtered and dried to give a Sn—Sb based sulfide. This Sn—Sb based sulfide is used as a negative electrode active material of lithium secondary battery, so that it can have the same degree of battery performance as a Sn—Sb based sulfide glass obtained by a glass melting method. The negative electrode using this Sn—Sb based sulfide is less likely to rapidly generate heat in an internal short circuit test, such as nail penetration, resulting in improvement of battery safety.

A solvent of the mixed solution of tin halide and antimony halide can be, but not particularly limited to, water, alcohols, ketones, organic acids, organic acid esters, and hydrocarbons. When, for example, tin halide is tin chloride ($SnCl_2$), antimony halide is antimony chloride ($SbCl_3$), and alkali metal sulfide is sodium sulfide ($Na_2S$), SnS and $Sb_2S_3$ can precipitate simultaneously to compound a Sn—Sb co-precipitate by a reaction of the following formula 1.

$2SnCl_2 + 2SbCl_3 + 4Na_2S \rightarrow SnS\downarrow + Sb_2S_3\downarrow + 8NaCl$ (formula 1)

A ratio of Sn and Sb in the above-mentioned mixed solution is preferably, but not limited to, Sn: 10 to 90 mol %, and more preferably 10 to 70 mol %, with respect to the total amount 100 mol % of Sn and Sb. If the ratio of Sn exceeds 90 mol %, its capacity decreases as the cycle proceeds, which is not preferable.

In the manufacturing method of the present invention, it is preferable that the mixed solution of the tin halide and antimony halide further contains an organic acid.

The organic acid is a substance of acidic property (acidity) among substances combined with an "organic" in which a carbon is a principal component.

The organic acid includes, but not specifically limited to, for example a tartaric acid, citric acid, malic acid, lactic acid, gluconic acid, succinic acid, fumaric acid, maleic acid, formic acid, valeric acid, stearic acid, acetic acid, ascorbic acid, amino acid, etc.

It is not easy to dissolve tin halides, especially $SbCl_3$, into water just by adding water and stirring it, thus requiring long-term dissolving time. For example, if $SnCl_2$ and $SbCl_3$ are dissolved simultaneously, precipitates of $Sb_2S_3$ with a large particle diameter are generated since $SbCl_3$ is hard to dissolve, often resulting in ununiform powders.

In order to address this issue, the solubility of various halides can be improved by an addition of the organic acid. This allows for shortening of the time required for the dissolution and obtaining of uniform Sn—Sb based sulfide powders.

Also, efficient disordered crystallization of the Sn—Sb based sulfide can be achieved by the addition of the organic acid. The disordered crystal refers to a substance in the intermediate state between a crystal and an amorphous. Taking antimony sulfide as an example, it has a structure wherein an antimony array is regular but a location and an array of a sulfur element around the antimony are random, and the antimony element exhibiting crystal structure and the sulfur element exhibiting amorphous structure are mixed in one substance. The disordered crystal provides a broad or weak diffraction peak in X-ray diffraction analysis.

Figure 1:
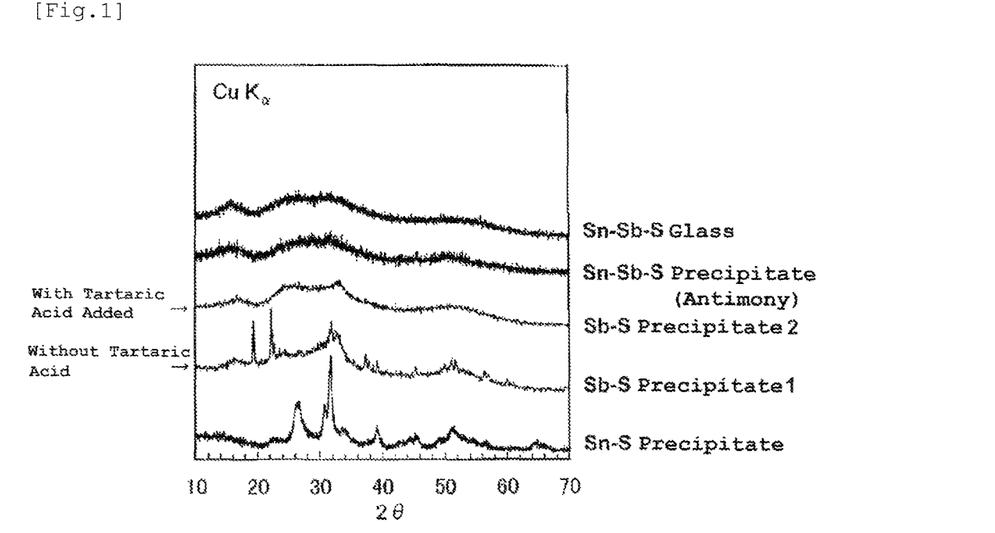
FIG. 1 is a XRD pattern of variety kinds of precipitates.

In order to examine what kinds of effects the addition of the organic acid has on the obtained Sn—Sb based sulfide, an organic acid with a tartaric acid added and an organic acid without the tartaric acid were prepared, and then a XRD measurement was performed. XRD patterns of various precipitates are shown in FIG. 1.

A tin sulfide-derived peak was observed for the precipitates obtained by mixing $SnCl_2$ aqueous solution and $Na_2S$ aqueous solution. An antimony sulfide peak was observed for the precipitates obtained by mixing $SbCl_3$ aqueous solution and $Na_2S$ aqueous solution.

On the other hand, it was found out that a XRD pattern became broad in precipitates obtained by mixing $SbCl_3$ aqueous solution and $Na_2S$ aqueous solution with the tartaric acid added, and that the precipitates have a specific effect, the disordered crystallization of the precipitates.

Precipitates obtained by mixing the mixed aqueous solution of $SnCl_2$ and $SbCl_3$ added with the tartaric acid and $Na_2S$ aqueous solution had a XRD pattern substantially consistent with that of the Sn—Sb based sulfide produced by a glass melting method. Accordingly, the manufacturing method by the precipitation of the present invention proved to be capable of preparing the sulfides.

In the manufacturing method of the present invention, it is preferable that the amount of alkali metal sulfide to be added is 1-4 mol with respect to 1 mol of the total amount of tin halide and antimony halide.

If the amount of the alkali metal sulfides to be added is less than 1 mol with respect to a total amount of 1 mol of the tin halide and antimony halide, a precipitation reaction is less likely to progress, causing the obtained Sn—Sb based sulfide to contain a lot of unreacted substances. On the other hand, if the amount of the alkali metal sulfides to be added is more than 4 mol with respect to a total amount of 1 mol of the tin halide and antimony halide, the deposited sulfide disappears and the desired Sn—Sb based sulfide cannot be obtained.

The precipitates of the Sn—Sb based sulfide may be obtained by any one of the following steps of:

(1) producing a compound powder with A component particle surface being coated with Sn—Sb based sulfide by dispersing A component powder in a mixed solution of tin halide and antimony halide, and subsequently adding an alkali metal sulfide solution into the mixed solution to produce, or (2) producing a compound powder with A component particle surface being coated with Sn—Sb based sulfide by dispersing A component powder in an alkali metal sulfide solution and subsequently adding the mixed solution of tin halide and antimony halide into the alkali metal sulfide solution, Wherein the A component is an element or a compound comprising the element which can occlude a lithium ion in early charge and occlude and release the lithium ion in the subsequent charge and discharge.

The A component may be a primary particle itself or also be an aggregated secondary particle etc. The Sn—Sb based sulfide may be completely coated on the entire surface of the A component, or may be coated on only a part of the A component. If it is coated on only a part of the A component, 25% or more of the surface area of the A component should only be coated with the Sn—Sb based sulfide. In the present invention, the ratio of the A component coated with the Sn—Sb based sulfide can be measured from the ratio of the surface of the A component particle covered with the Sn—Sb based sulfide using, for example, s SEM photograph.

The A component contained in the compound powder may be at least one or more kinds of an element selected from the group consisting of, but not specifically limited to, for example, Li, Na, C, Mg, Al, Si, P, K, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb, and Bi, or an alloy, oxide, chalcogenide, or halide using these elements, as long as the A component can occlude lithium ions in the early charge and occlude and release the lithium ions in the subsequent charge and discharge. From a perspective that the region of discharge plateau can be observed within the range of 0-1V (with respect to electric potential for lithium), at least one or more kinds of an element selected from the group consisting of Li, C, Mg, Al, Si, Ti, Zn, Ge, Ag, In, Sn, and Pb, or an alloy, oxide, chalcogenide, or halide using these elements are preferable among them. Furthermore, from a perspective of energy density, Al, Si, Zn, Ge, Ag, and Sn, etc. are preferable as an element, each combination such as Si—Al, Al—Zn, Si—Mg, Al—Ge, Si—Ge, Si—Ag, Si—Sn, Zn—Sn, Ge—Ag, Ge—Sn, Ge—Sb, Ag—Sn, Ag—Ge, and Sn—Sb, etc are preferable as an alloy, SiO, SnO, $SnO_2$, $SnC_2O_4$, and $Li_4Ti_5O_{12}$, etc. are preferable as an oxide, SnS, and $SnS_2$, etc. are preferable as a chalcogenide, and $SnF_2$, $SnCl_2$, $SnI_2$, and $SnI_4$, etc. are preferable as a halide. Also, two or more kinds of these A components may be used.

In the manufacturing method of the present invention, a ratio of A component to Sn—Sb based sulfide in the compound powder is preferably A component: 10 to 80 mass % and Sn—Sb based sulfide: 90 to 20 mass %, given the total of the both is 100 mass %.

Furthermore, it is more preferable that the A component is 20 to 70 mass % and the Sn—Sb based sulfide is 80 to 30 mass %.

For example, in the case where the A component is Si, when the A component (Si) is 10-35 mass % and the Sn—Sb based sulfide is 90-65 mass %, the capacity per active material weight is 400-1,600 mAh/g and the cycle life characteristics is highly improved. Thus, the active material is promising as a long life type of negative electrode. On the other hand, when the A component (Si) is 35-80 mass % and the Sn—Sb based sulfide is 65-20 mass %, the capacity per active material weight is as very high as 1300-3500 mAh/g. Thus, the active material is promising as a high capacity type of negative electrode.

In the manufacturing method of the present invention, the particle diameter D50 by the laser diffraction/dispersion type particle size distribution method of the A component is preferably 0.1-20 micrometer.

If it is less than 0.1 micrometer, the A component is easy to aggregate, often resulting in ununiform compound powders. If it is more than 20 micrometer, a crack is generated in the A component in charging and discharging, thereby decreasing the cycle life.

In the manufacturing method of the present invention, the step of generating compound powders is preferably a step of generating compound powders with the mixed solution of the tin halide and antimony halide further containing a conductive auxiliary agent and/or binding agent, wherein the A component particle surface is coated with Sn—Sb based sulfide and the conductive auxiliary agent and/or the binding agent is contained in the Sn—Sb based sulfide.

It is preferable to use, but not specifically limited to, a carbon black as a conductive auxiliary agent, since a metal or conductive polymer possibly reacts with the Sn—Sb based sulfide. The carbon black includes an acetylene black (AB), ketjen black (KB), carbon fiber (VGCF), carbon nanotube (CNT), graphite, graphene, soft carbon, hard carbon, etc.

When the Sn—Sb based sulfide is 100 mass %, the content of the conductive auxiliary agent is preferably 0.1-10 mass %, and more preferably 0.5-5 mass % for 100 mass %. If the content is 0.1 to 10 mass %, a sufficient conductive improvement effect is achieved, allowing for an improvement of high rate discharging characteristic and holding capacity lowering to a minimum due to falling of the Sn—Sb based sulfide from the A component. If a conducting agent with high cohesiveness, for example, the carbon black is used among the above-mentioned conductive auxiliary agents, it is preferable to disperse the conductive auxiliary agent by an agitator or supersonic wave, etc.

EXAMPLE

Hereinafter, the present invention will be explained more specifically by Examples but is not limited to these Examples.

(1) Preparation of Sn—Sb Based Sulfide

In order to make a predetermined ratio of Sn and Sb showing in Table 1 below, a tin chloride ($SnCl_2$) aqueous solution was mixed with an antimony chloride ($SbCl_3$) aqueous solution to produce a tin-antimony chloride aqueous solution. The amount of tartaric acid as shown in Table 1 was added to this tin-antimony chloride aqueous solution, and then a sodium sulfide aqueous solution containing the amount of sodium sulfide ($Na_2S$) as shown in Table 1 was mixed with the solution to prepare precipitates of the Sn—Sb based sulfide.

TABLE 1

|  | Sn:Sb (Molar Ratio) | $SnCl_2 \cdot 2H_2O$ | $SbCl_3$ | $NA_2S$ | Tartaric Acid |
|---|---|---|---|---|---|
| Example 1 | 90:10 | 8.148 g | 0.494 g | 3.5 g | 4.160 g |
| Example 2 | 70:30 | 6.370 g | 1.448 g | 4.2 g | 4.104 g |
| Example 3 | 50:50 | 4.982 g | 2.341 g | 5.08 g | 4.069 g |
| Example 4 | 30:70 | 1.384 g | 1.584 g | 5.38 g | 4.201 g |
| Example 5 | 10:90 | 0.500 g | 2.185 g | 6.48 g | 4.000 g |

Figure 2:
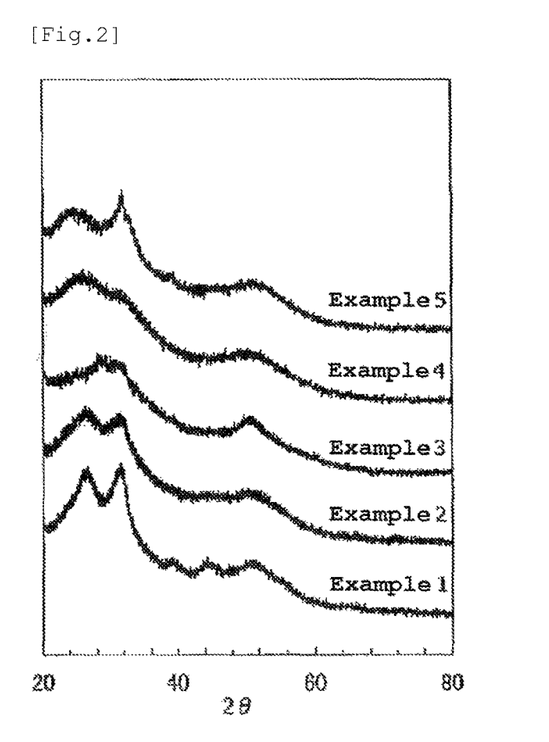
FIG. 2 is a XRD pattern of Sn—Sb based sulfides of Examples 1-5.

XRD patterns of the obtained precipitates of the Sn—Sb based sulfide in Examples 1-5 are shown in FIG. 2. In the Sn—Sb based sulfides of Examples 1-5, no sharp peak derived from $Sb_2S_3$ or $SnS_2$ is observed and the disordered crystallization can be found.

(2) Preparation of Sn—Sb Based Sulfide with A Component Added

In order to make a predetermined ratio of Sn and Sb showing in Table 2 below, a tin chloride ($SnCl_2$) aqueous solution was mixed with an antimony chloride ($SbCl_3$) aqueous solution to produce a tin-antimony chloride aqueous solution. The amount of tartaric acid as shown in Table 2 was added to this tin-antimony chloride aqueous solution, and then a sodium sulfide aqueous solution containing the amount of sodium sulfide ($Na_2S$) and the A component as shown in Table 2 was mixed with the solution and dispersed to prepare precipitates of the Sn—Sb based sulfide with the A component added.

TABLE 2

| | Sn:Sb (Molar Ratio) | SnCl$_2$•2H$_2$O | SbCl$_3$ | NA$_2$S | AComponent | Tartaric Acid |
|---|---|---|---|---|---|---|
| Example 6 | 70:30 | 6.210 g | 1.461 g | 4.1 g | 1.8 g (A Component:Si) | 4.100 g |
| Example 7 | 70:30 | 6.217 g | 1.442 g | 4.1 g | 3.0 g (A Component:Si) | 4.100 g |
| Example 8 | 70:30 | 6.199 g | 1.450 g | 4.1 g | 4.9 g (A Component:Si) | 4.099 g |
| Example 9 | 70:30 | 6.215 g | 1.447 g | 4.1 g | 1.9 g (A Component:Sn) | 4.080 g |
| Example 10 | 70:30 | 6.200 g | 1.444 g | 4.1 g | 1.8 g (A Component:SiO) | 4.011 g |

(3) Preparation of Sn—Sb Based Sulfide Glass

A sulfur, antimony, tin, and germanium were blended so as to become 60:9:16:15 mol % and the contents were melted by heat treatment to produce a sulfide glass. As a heat treatment condition, after the sulfide glass was increasingly heated to a prescribed temperature with the heating rate of 20° C./hour, and then was kept at the same temperature for 12 hours. Then, it was naturally cooled down to the room temperature to be completed. The obtained sulfide was found to be vitrified according to the XRD measurement using a X-ray diffractometer (FIG. 1).

Production of Test Negative Electrode

The obtained precipitates of the Sn—Sb based sulfide in Examples 1-10 were filtered, dried, and used as negative electrode active materials. Also, for a comparison, the above-mentioned Sn—Sb based sulfide glass was used as a negative electrode active material in Comparative Example 1 and Si (made by Fukuda Metal: D50=1 micrometer) was used as a negative electrode active material in Comparative Example 2, respectively.

These negative electrode active materials, a carbon powder agent (made from Lion Corporation: ECP300), and a polyimide binder were blended so as to become 80:5:15 mass %, and the slurried material was coated on a 10 micrometer thick of stainless foil and dried under reduced pressure at 250° C. to obtain a test negative electrode.

Cell Testing

A CR2032 coin cell equipped with a test negative electrode, a glass filter (GA-100), a metal lithium counter electrode, and a 1M LiPF$_6$ (EC:DEC=50:50 vol %) electrolytic solution was used for a cell testing.

Figure 3:
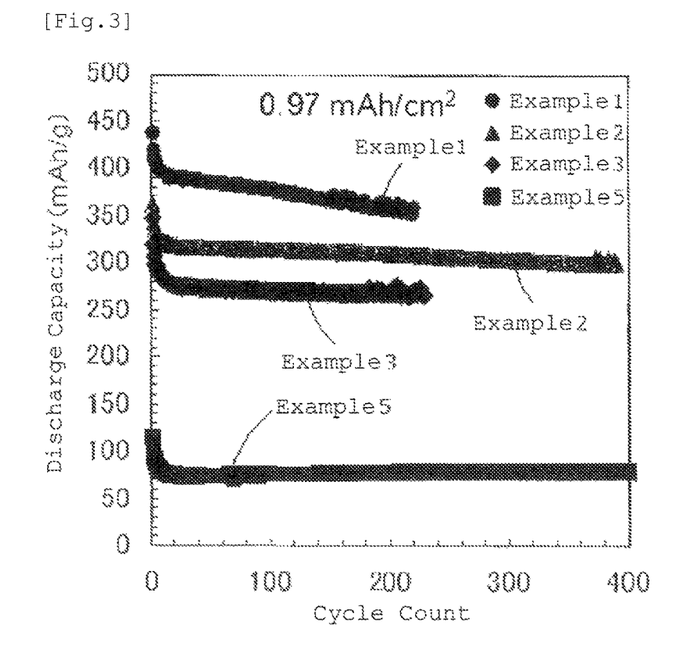
FIG. 3 is a cycle life characteristic of the negative electrode using the Sn—Sb based sulfide of Examples 1-3, and 5 as an active material.
Figure 4:
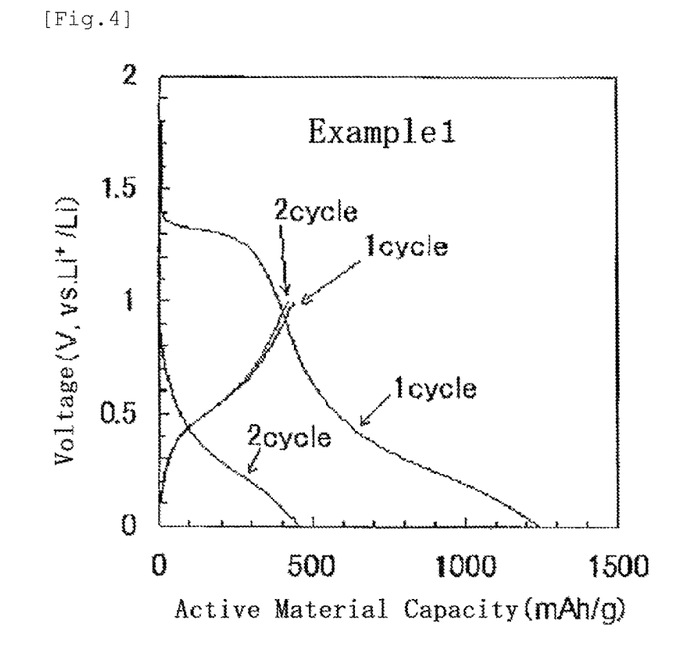
FIG. 4 is a charge-and-discharge curve of the negative electrode using the Sn—Sb based sulfide of Example 1 as an active material.
Figure 5:
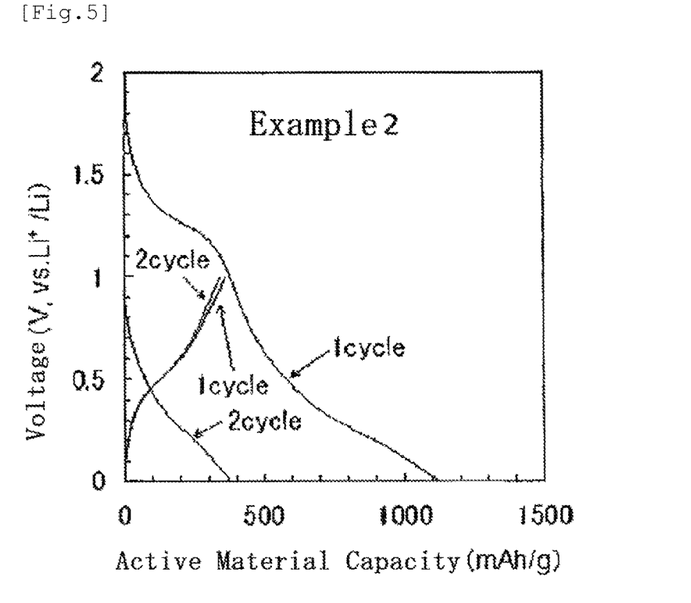
FIG. 5 is a charge-and-discharge curve of the negative electrode using the Sn—Sb based sulfide of Example 2 as an active material.
Figure 6:
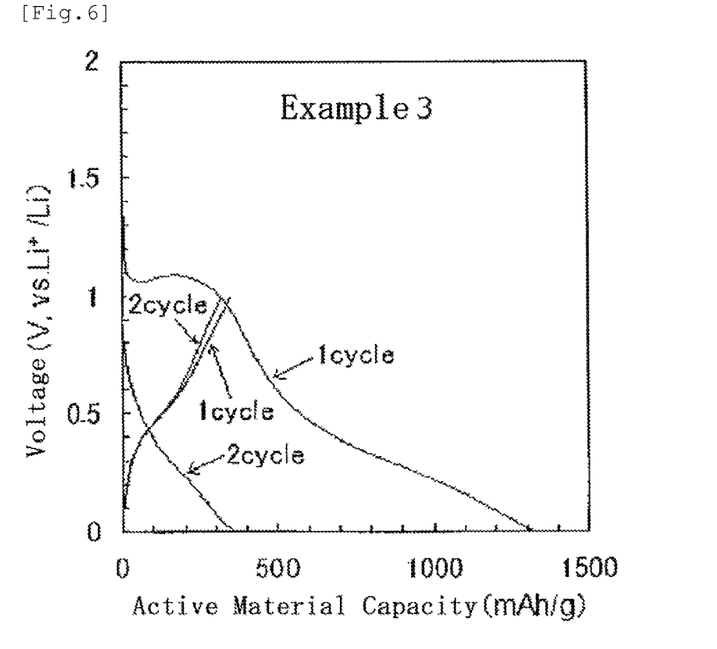
FIG. 6 is a charge-and-discharge curve of the negative electrode using the Sn—Sb based sulfide of Example 3 as an active material.
Figure 7:
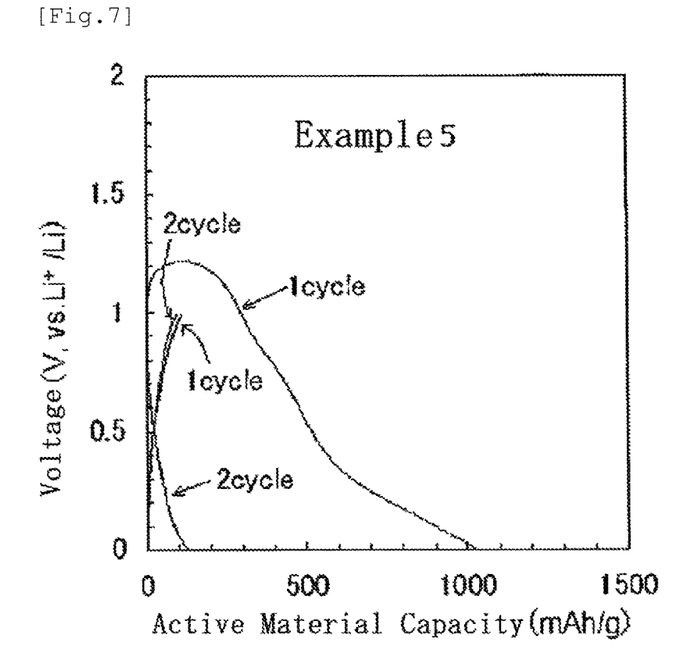
FIG. 7 is a charge-and-discharge curve of the negative electrode using the Sn—Sb based sulfide of Example 5 as an active material.
Figure 8:
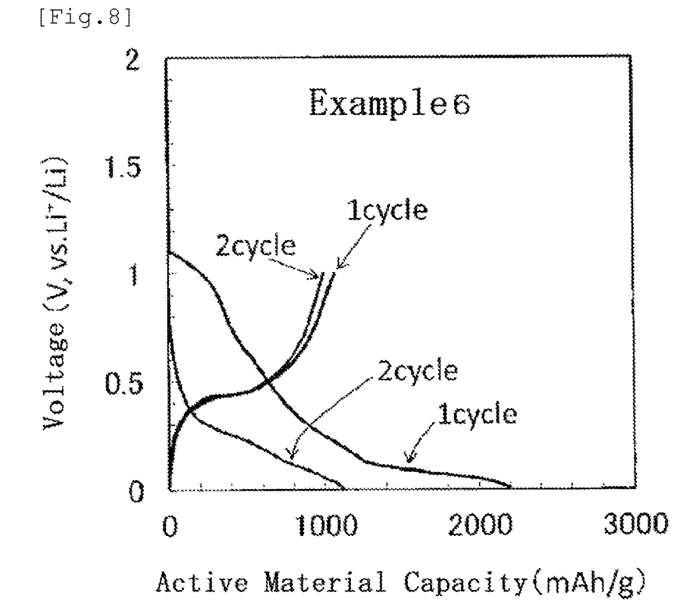
FIG. 8 is a charge-and-discharge curve of the negative electrode using the Sn—Sb based sulfide of Example 6 as an active material.
Figure 9:
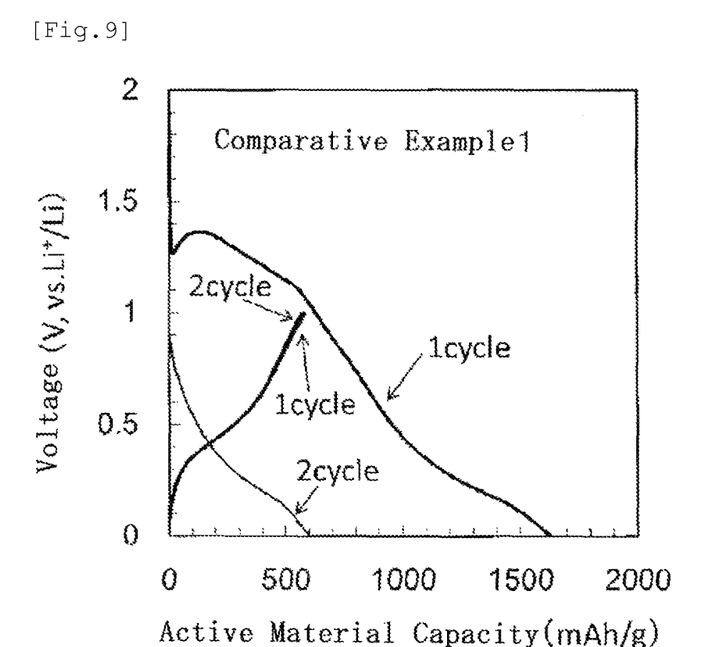
FIG. 9 is a charge-and-discharge curve of the negative electrode using the Sn—Sb based sulfide of a comparative example 1 as an active material.

The cycle life characteristics of the negative electrodes in Examples 1-10 and Comparative Examples 1-2 are summarized in Table 3. A charging and discharging test condition was set as environmental temperature: 30° C., cutoff potential: 0-1 (V, vs. Li$^+$/Li), and charging and discharging current rate: 0.2 C. As an example, the cycle life characteristics of the negative electrodes in Examples 1-3, and 5 are shown in FIG. 3. Also, the charge and discharge curves in Examples 1-3, 5, and 6 and Comparative Example 1 are shown in FIGS. 4-9.

In Example 1, high capacity was seen because of the relatively high ratio of Sn, while capacity lowering was gradually found as the cycle proceeds. On the other hand, in each sample of Examples 2, 3, and 5, relatively stable capacity was seen, and high capacity was seen in Example 2 among them.

In Examples 6-10, further higher capacity could be achieved as compared with Example 3, since the A component was added to the component of Example 3.

TABLE 3

| | Discharging Capacity | | |
|---|---|---|---|
| | 1 cycle | 10 cycle | 100 cycle |
| Example 1 | 439 mAh/g | 396 mAh/g | 378 mAh/g |
| Example 2 | 362 mAh/g | 322 mAh/g | 314 mAh/g |
| Example 3 | 347 mAh/g | 283 mAh/g | 271 mAh/g |
| Example 4 | 230 mAh/g | 196 mAh/g | 189 mAh/g |
| Example 5 | 116 mAh/g | 78 mAh/g | 77 mAh/g |
| Example 6 | 1070 mAh/g | 858 mAh/g | 705 mAh/g |
| Example 7 | 1280 mAh/g | 1005 mAh/g | 761 mAh/g |
| Example 8 | 1510 mAh/g | 1104 mAh/g | 785 mAh/g |
| Example 9 | 590 mAh/g | 466 mAh/g | 371 mAh/g |
| Example 10 | 850 mAh/g | 680 mAh/g | 612 mAh/g |
| Comparative Example 1 | 583 mAh/g | 570 mAh/g | 553 mAh/g |
| Comparative Example 2 | 3263 mAh/g | 2530 mAh/g | 245 mAh/g |

INDUSTRIAL APPLICABILITY

The negative electrode active material obtained by the manufacturing method of the present invention has the equivalent performance to the negative electrode active material obtained by the glass melting method, and the manufacturing method of the present invention requires no high temperature processing steps or special facilities as needed in the conventional glass melting method and allows for easy production at low cost, such that it can be conveniently utilized for use in main power supplies, etc., of, for example, a mobile communication device, a portable electronic device, a battery-assisted bicycle, a battery-assisted two-wheeled vehicle, and an electric vehicle.

What is claimed is:

1. A negative electrode for a lithium secondary battery comprising:
    a negative electrode active material containing a precipitate including an Sn—Sb based sulfide obtained by adding alkali metal sulfide to a mixed solution of tin halide and antimony halide in a solvent, the solution further containing an organic acid, wherein the Sn—Sb based sulfide has a disordered crystal structure which is in an intermediate state of a crystal and an amorphous;
    wherein the Sn—Sb based sulfide includes 10 to 90 mole percent Sn based on the total moles of Sn and Sb; and
    wherein the organic acid includes tartaric acid, citric acid, malic acid, lactic acid, gluconic acid, succinic acid, fumaric acid, maleic acid, formic acid, valeric acid, acetic acid, ascorbic acid, or an amino acid.

2. The negative electrode according to claim 1, wherein the negative electrode active material includes a compound powder including a first component particle surface coated with a second component including the Sn—Sb based sulfide, wherein the first component is an element or a compound comprising the element capable of occluding a lithium ion in early charge, and occluding and releasing the lithium ion in the subsequent charge and discharge.

3. The negative electrode according to claim 2, wherein a ratio of the first component to the Sn—Sb based sulfide in the compound powder is the first component: 10 to 80 mass % and the Sn—Sb based sulfide: 90 to 20 mass %, given the total of the both is 100 mass %.

4. The negative electrode according to claim 3, wherein a particle diameter D50 of the first component by a laser diffraction/a dispersion-type particle size distribution method is 0.1-20 micrometer.

5. The negative electrode according to claim 2, wherein a particle diameter D50 of the first component by a laser diffraction/a dispersion-type particle size distribution method is 0.1-20 micrometer.

6. The negative anode of claim 1, wherein the negative electrode active material has a conductive auxiliary agent, wherein the conductive auxiliary agent includes:
   i) a carbon based material selected from the group consisting of an acetylene black (AB), a ketjen black (KB), a carbon fiber (VGCF), a carbon nanotube (CNT), a graphene, and a soft carbon; or
   ii) an element selected from the group consisting of Li, Na, Mg, Al, Si, P, K, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb, and Bi.

7. The negative anode of claim 1, wherein the negative electrode active material is prepared without melting the precipitate.

8. The negative electrode of claim 1, wherein the solvent includes water, an alcohol, a ketone, an organic acid ester, or a hydrocarbon.

9. A method of manufacturing a negative electrode including a negative electrode active material for a lithium secondary battery including a precipitate containing Sn—Sb based sulfide, comprising a step of obtaining a precipitate of Sn—Sb based sulfide by adding alkali metal sulfide to a mixed solution of tin halide and antimony halide in a solvent, the solution further containing an organic acid,
   wherein the negative electrode includes the precipitate;
   the Sn—Sb based sulfide includes 10 to 90 mole percent Sn based on the total moles of Sn and Sb; and
   the organic acid includes tartaric acid, citric acid, malic acid, lactic acid, gluconic acid, succinic acid, fumaric acid, maleic acid, formic acid, valeric acid, acetic acid, ascorbic acid, or an amino acid.

10. The method of manufacturing a negative electrode active material for lithium secondary battery according to claim 9, wherein the amount of alkali metal sulfide to be added is 1-4 mol with respect to 1 mol of the total amount of tin halide and antimony halide.

11. The method of manufacturing a negative electrode active material for lithium secondary battery according to claim 10, comprising:
   producing a compound powder with a first component particle surface being coated with a second component including the Sn—Sb based sulfide by dispersing the first component powder in a mixed solution of tin halide and antimony halide, and subsequently adding an alkali metal sulfide solution into the mixed solution, or
   producing a compound powder with a first component particle surface being coated with a second component including the Sn—Sb based sulfide by dispersing the first component powder in an alkali metal sulfide solution and subsequently adding the mixed solution of tin halide and antimony halide into the alkali metal sulfide solution,
   wherein the first component is an element or a compound comprising the element capable of occluding a lithium ion in early charge, and occluding and releasing the lithium ion in the subsequent charge and discharge.

12. The method of manufacturing a negative electrode active material for lithium secondary battery according to claim 9, comprising:
   producing a compound powder including a first component particle surface being coated with a second component including the Sn—Sb based sulfide by dispersing the first component powder in a mixed solution of tin halide and antimony halide, and subsequently adding an alkali metal sulfide solution into the mixed solution, or
   producing a compound powder including a first component particle surface being coated with a second component including the by dispersing the first component powder in an alkali metal sulfide solution and subsequently adding the mixed solution of tin halide and antimony halide into the alkali metal sulfide solution,
   wherein said first component is an element or a compound comprising the element capable of occluding a lithium ion in early charge, and occluding and releasing the lithium ion in the subsequent charge and discharge.

13. The method of manufacturing a negative electrode active material for lithium secondary battery according to claim 12, wherein a ratio of the first component to the Sn—Sb based sulfide in said compound powder is the first component: 10 to 80 mass % and the Sn—Sb based sulfide: 90 to 20 mass %, given the total of the both is 100 mass %.

14. The method of manufacturing a negative electrode active material for lithium secondary battery according to claim 12, a particle diameter D50 of the first component by a laser diffraction/a dispersion-type particle size distribution method is 0.1-20 micrometer.

15. The method of manufacturing a negative electrode active material for lithium secondary battery according to claim 12, wherein the mixed solution of tin halide and antimony halide further contains an conductive auxiliary agent and/or a binding agent to produce a compound powder, wherein the first component particle surface is coated with Sn—Sb based sulfide and the conductive auxiliary agent and/or the binding agent is contained in the Sn—Sb based sulfide.

16. The method of claim 9, wherein the negative electrode active material has a conductive auxiliary agent, wherein the conductive auxiliary agent includes:
   i) a carbon based material selected from the group consisting of an acetylene black (AB), a ketjen black (KB), a carbon fiber (VGCF), a carbon nanotube (CNT), a graphene, and a soft carbon; or
   ii) an element selected from the group consisting of Li, Na, Mg, Al, Si, P, K, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb, and Bi.

17. The method of claim 9, wherein the negative electrode active material is prepared without melting the precipitate.

18. The method of claim 9, wherein the solvent includes water, an alcohol, a ketone, an organic acid ester, or a hydrocarbon.

* * * * *